United States Patent Office 2,913,116
Patented Nov. 17, 1959

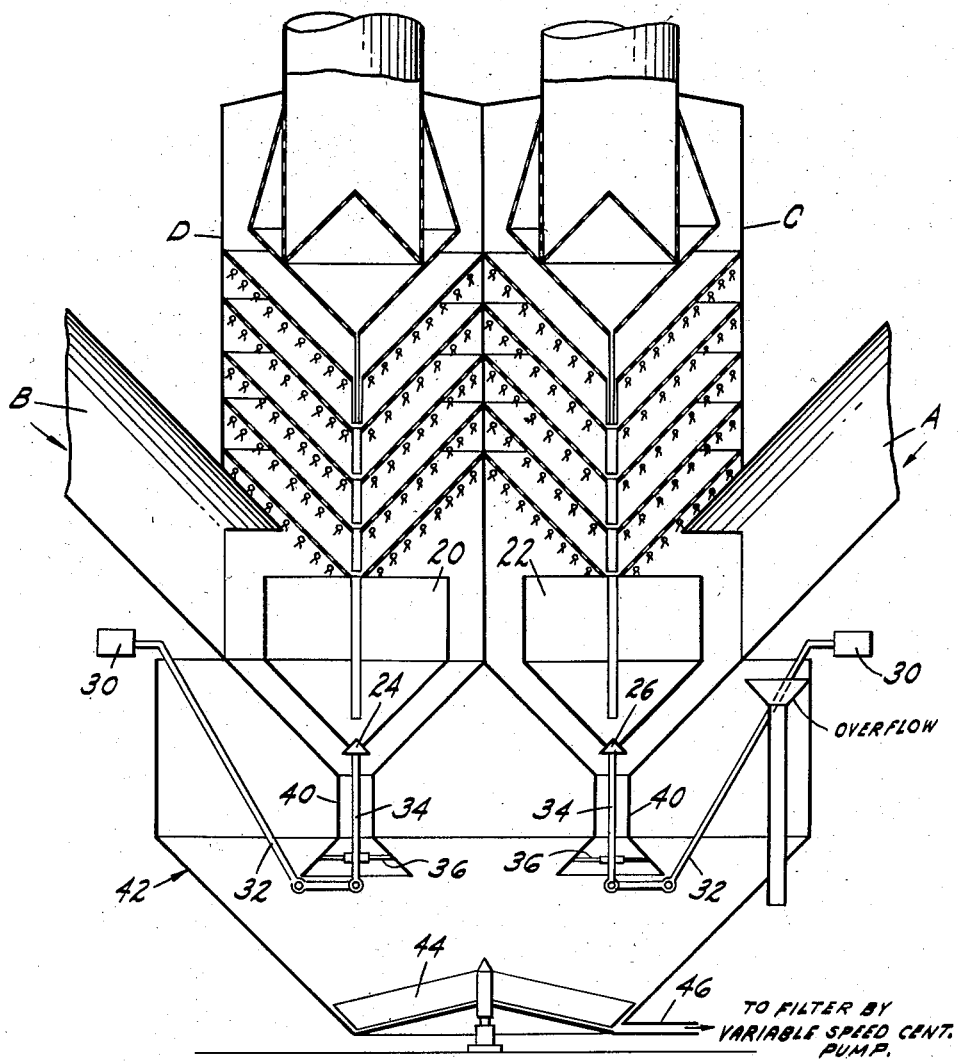

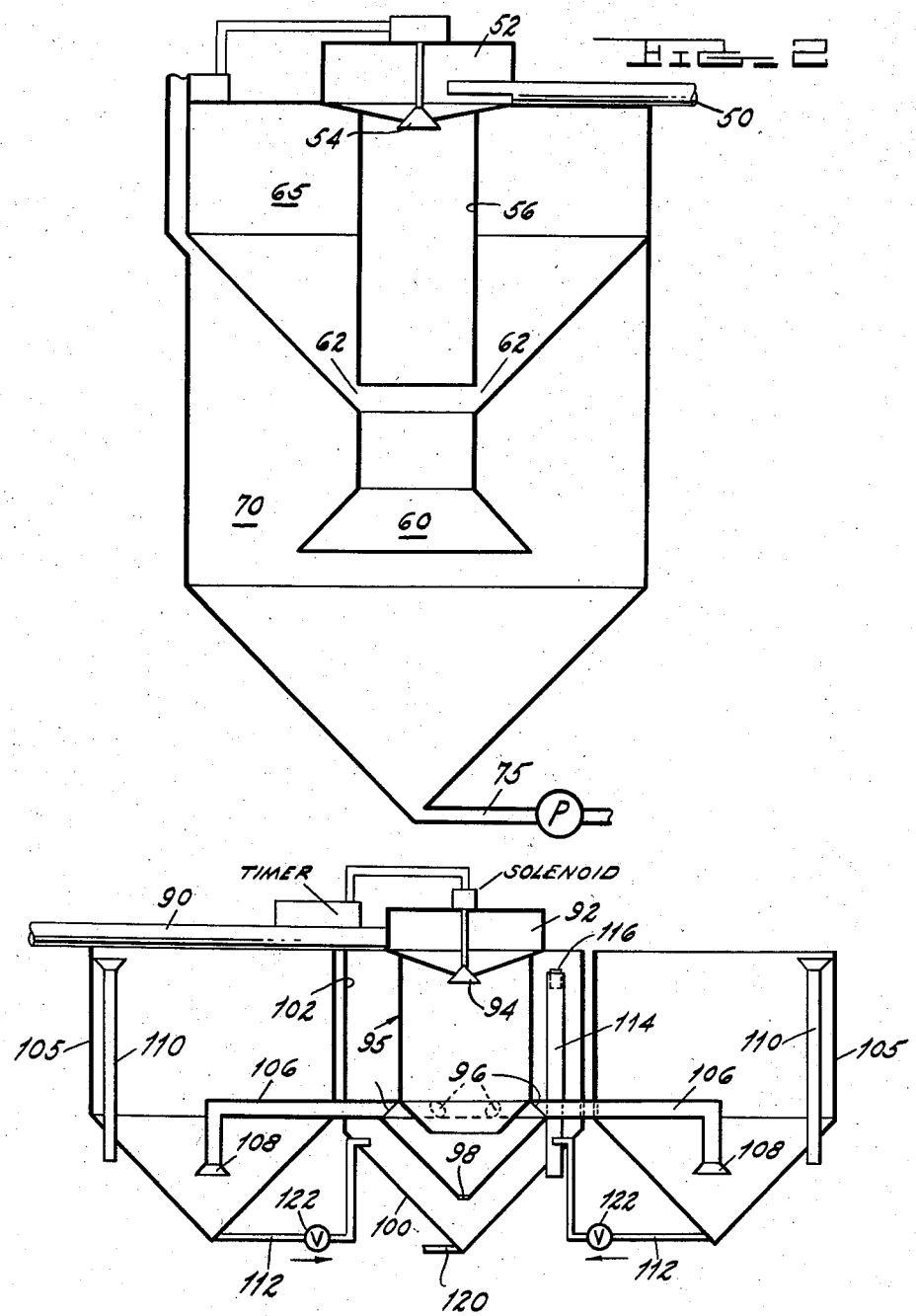

2,913,116

METHOD AND APPARATUS FOR SEPARATING USABLE PARTICLES FROM COLLECTING LIQUID

Martin L. Cover, Churchville, N.Y.

Application December 30, 1955, Serial No. 556,576

5 Claims. (Cl. 210—73)

This invention relates to a method and apparatus for separating usable particles from a collecting liquid.

The method and apparatus have particular use in steel mill plants where dust and fuel particles are collected and washed and subsequently separated for use in sinter beds. It is always a problem in these steel mill installations to provide enough space for equipment to separate and settle the material being salvaged. Another problem is the time of operation. For any particular installation there is a certain amount of material that is collected, and in any settling operation there is a certain amount of time that is required to obtain efficient settling. Numerous attempts have been made to reduce the space required for this settling equipment and also to increase the efficiency of settling.

The present invention is directed to the problem of reducing the ground space for settling apparatus and also increasing the capacity of particular tanks used for settling in making it possible to increase the height of these tanks by a novel system of operation.

It is known that the best system of settling particles from a liquid is in a stagnant quantity of such liquid. When there is a continuous flow to a body of liquid which is being used for settling, there is a continuous rising of the liquid toward an overflow; and the rate of rising of this liquid is limited by the efficiency requirements of the device.

The present invention contemplates an apparatus and a method which can be used to reduce the upward flow of a settling basin and at the same time increase the quantity of material introduced into said basin.

Other objects and features of the invention will be apparent in the following description and claims.

In the drawings:

Figure 1 illustrates a diagrammatic sectional view of a settling tank shown in conjunction with a washing type of collector housing.

Figure 2 illustrates a modified tank for recovery of solids.

Figure 3 illustrates an assembly of tanks utilizing a central main separator and radially disposed sub-settling tanks.

The disclosure of Figure 1 combines my washer and settler for gases disclosed in my Patent No. 2,539,992, issued January 30, 1951, with a suitable settling tank to accumulate the recoverable solids and thicken them to the point that they may be transferred and used. Gases enter the device at A and B and rise through the tanks C and D, the solids being washed out as described in the above patent and passing down into the tank 20 or 22, which holds about a minute's supply of water. The bottoms of the tanks are closed by valves 24 and 26, respectively, each of which is held in closed position by a counter-weight 30 acting through a bell crank lever 32 which exerts an upward force on guided shaft 34. A spider 36 guides this shaft.

When the head in tanks 20 and 22 reaches a certain height, the valves 24 and 26 will open by reason of the downward force thereon, overbalancing the weights 30. Pipe 40 is of sufficient size that it requires about one-quarter minute for the water to flow down from the upper tanks 20 and 22. The velocity of the water flowing out will hold the valves open until the counter-weight overcomes this pressure. It will be seen that the counter-weight swings into a shorter turning arm as the valve opens. With this arrangement, there is a tendency for the heavier particles to settle out in tanks 20 and 22 and to deposit immediately toward the bottom of the large tank 42, into which pipes 40 discharge. Tank 42 is several times larger than combined tanks 20 and 22 as illustrated and as will be apparent from the described operation of the device.

In addition, due to the intermittent opening of the valves 24 and 26, the liquid in tank 42 is not continuously being agitated; and consequently, settling in tank 42 can proceed much faster. I have thus discovered that the speed of rise of the water does not greatly affect the ultimate clarity, providing the rising is alternated by periods of rest.

In the bottom of tank 42 is a three-arm, variable speed, slow-moving paddle 44 which has rigid vanes rubber-tipped to keep the solids in suspension to facilitate the flow toward an outlet opening 46, which is controlled by a variable speed centrifugal pump to carry the material to a filter or directly to a sinter mix as desired.

With this arrangement, I have found that I could have the water rise at 12 to 18 inches a minute during the flow periods instead of the usual maximum of 2 inches a minute, and I can really handle more water to the same clarity condition this way. For example, in a tank 30 feet high, water can be introduced to raise the 30 feet in one minute steps and have it stagnant 30 minutes of each hour. With the 20 foot rise, the step time is 20 minutes and the stagnant time is 30 minutes, so the hourly rate is 60/50 times that of two continuous flow, stacked tanks, each 10 feet in height. With a 10 foot tank, the step time is 10 minutes and the stagnant time is 30 minutes, so the hourly rate is 60/40 times that of a single continuous flow 10 foot tank.

In Figure 2, I have shown a modified type of device which has a standard in-flow for the liquid carrying material at 50. Material enters the chamber 52 from pipe 50 and a counter-weighted control valve 54 controls the discharge into a separator pipe 56. The valve 54 can be counter-weighted in the same manner as shown in Figure 1, or it may be automatically operated by a solenoid and timer on a predetermined time basis. One minute's supply to tank 52 dumps in 15 seconds through valve 54. The water enters chamber 56 at, for example, 100 g.p.g. (grains per gallon) and part of it leaves through the outlet 60 with the heavier particles and part leaves through the small space 62 to a large tank 65. The final settling is accomplished in both tanks. The entire material settling out will flow downward to the thickening point at the bottom of tank 70 and passes to the ultimate outlet 75, which can be controlled by a variable speed centrifugal pump. This particular device shown in Figure 2 is for the purpose of using a high tank where ground space is limited. Each chamber may be at least 30 feet high when the step flow idea is used. The device shown can be 30 feet to 60 feet in diameter.

In Figure 3, the particle bearing material enters through pipe 90 to the entry tank 92 having a bottom control valve 94 which may be operated mechanically or automatically with a time cycle, for example, a 15 second open valve position out of a minute, with 45 second closed period. The first separator unit 95 receives material from tank 92; and if we assume that water enters at about 100 g.p.g., about 75% of the coarse material leaves the bottom through opening 98.

The material containing about 25 g.p.g. goes through openings 96 to tanks 105. The material leaving through the ports 96 containing about 25 g.p.g. goes to a plurality of settler tanks 105 arranged around the central tank 102, reaching these tanks through pipes 106 which discharge at 108 near the bottom of tanks 105. In installations where ground space is available, six of these 30 foot diameter settlers could be disposed around the central tank. Each of these tanks 105 has an effluent outlet 110. From the bottom of tanks 105 the pipe 112 will convey liquid containing from 1% to 10% solids to the thickener tank 100 by gravity. This tank 100—102 has an overflow or effluent drain 114 with an adjustable flow control at the top at 116 so that the head in the side tanks 105 will always be greater than the head in the central tank 102.

With this arrangement, it is possible for a very efficient recovery of usable solids which will be stored at the thickening portion 100 of the tank 102 and which will flow from these to a sludge receiver to a filter through a pipe 120. A check valve 122 is provided in pipes 112 to provide one-way flow therein. Stop valves could also be provided in these lines if it is desired to isolate any tank for cleaning or repair.

In each of the above embodiments the step-settling principle is embodied, that is, the idea of introducing a quantity of the total flow in a short time and allowing undisturbed settling for the remainder of the time. The whole system is thus timed for more efficient settling.

I claim:

1. The method of separating usable particles from a liquid in which they are suspended which comprises, providing a primary container and a secondary container arranged for gravity flow from the first to the second, introducing the material composed of the combined liquid and particles at a substantially continuous rate into the primary container, introducing said material intermittently from said primary container to said secondary container at a much more rapid rate at intervals spaced such that the introducing period is only a fraction of the ensuing period when no material is being transferred, allowing the suspended particles to separate by gravity in both the primary and secondary containers during the period when no material is being transferred, and removing the thickened material from the bottom of the secondary container.

2. An apparatus for facilitating the separation of usable particles from the liquid in which they are suspended which comprises, a primary receiver tank, means for conducting material composed of liquid and particles continuously into said receiver tank, a closed valve in the bottom of said tank, a secondary settling tank beneath said receiver tank, means for opening said valve at predetermined intervals determined by the collection in said receiver tank of generally a predetermined quantity of material, whereby to dump the contents of said receiver tank into said settling tank, and means in said settling tank to discharge thickened material to a suitable outlet.

3. A device as defined in claim 2 in which the valve is actuated by gravity due to the weight of material in the receiver tank, and means is provided including a lever arm and counter-weight for exerting a predetermined force on said valve to effect opening when predetermined weight is exerted thereon, said means comprising a lever arm, the effective length of which is shortened as the valve opens.

4. An apparatus for facilitating the separation of usable particles from the liquid in which they are suspended, which comprises, a primary receiver tank of relatively small capacity, means for conducting material composed of liquid and particles continuously into said receiver tank, a closed valve in the bottom of said tank, a secondary settling tank beneath said receiver tank having a capacity several times that of the receiver tank, means to open said valve in response to a predetermined charge in said receiver tank to dump the contents of said receiver tank into said settling tank, and means in said settling tank to discharge thickened material to a suitable outlet.

5. The method of separating usable particles from a liquid in which they are suspended which comprises, introducing the material generally continually into a relatively small primary container, transferring the material intermittently from said primary container to a relatively larger secondary container at a much more rapid rate than the general rate of introduction into said primary container, the transfer intervals being spaced such that the transferring period is only a fraction of the ensuing period when no material is being transferred, maintaining the material in the secondary container in a generally stagnant condition during the intervals between transfers so that particles in the material separate by gravity therein and removing the thickened material from the bottom of said second container.

References Cited in the file of this patent

UNITED STATES PATENTS

| | | |
|---|---|---|
| 196,259 | Solvay | Oct. 16, 1877 |
| 486,495 | Nibelius | Nov. 22, 1892 |
| 1,005,522 | Dull | Oct. 10, 1911 |
| 1,137,351 | Rapp | Apr. 27, 1915 |
| 1,337,279 | Sensibar | Apr. 20, 1920 |
| 1,420,250 | Gavett | June 20, 1922 |
| 1,530,592 | Bradley | Mar. 24, 1925 |
| 1,633,858 | Groves | June 28, 1927 |
| 1,847,864 | Cross | Mar. 1, 1932 |
| 1,906,916 | Mitchell | May 2, 1933 |

FOREIGN PATENTS

| | | |
|---|---|---|
| 283,469 | Germany | May 1, 1914 |